United States Patent [19]

Van de Leest

[11] Patent Number: 4,610,933
[45] Date of Patent: Sep. 9, 1986

[54] DUPLICATION MASTER SUITABLE FOR THE MANUFACTURE OF ELECTROPLATED COPIES

[75] Inventor: Renaat E. Van de Leest, Eindhoven, Netherlands

[73] Assignee: U.S. Philips Corporation, New York, N.Y.

[21] Appl. No.: 705,758

[22] Filed: Feb. 25, 1985

[30] Foreign Application Priority Data

Mar. 2, 1984 [NL] Netherlands ................. 8400675

[51] Int. Cl.$^4$ ............................................. C03B 11/00
[52] U.S. Cl. ................................. 428/627; 428/687
[58] Field of Search ............................. 428/627, 687

[56] References Cited

U.S. PATENT DOCUMENTS 4,226,082 10/1980 Nishida ................. 428/627
4,257,854 3/1981 Daenen et al. ................. 204/36

OTHER PUBLICATIONS

Aronson, A. J., et al., "Preparation of Titanium Nitride by a Pulsed D.C. Magnetron . . ." *Thin Solid Films*, vol. 72, pp. 535–540 (1980).

van de Berg, J. F. M. et al., "The Electrodeposition of Aluminium," *Philips Technical Review*, vol. 39, No. 314, pp. 87–91 (1980).

*Primary Examiner*—Veronica O'Keefe
*Attorney, Agent, or Firm*—Marc D. Schechter

[57] ABSTRACT

A master suitable for the manufacture of electroplated negative metal copies. The master comprises a preform which on at least one side has a layer of electroplated aluminum. The surface has a precisely machined profile and is coated with a titanium nitride layer.

4 Claims, 2 Drawing Figures

DUPLICATION MASTER SUITABLE FOR THE MANUFACTURE OF ELECTROPLATED COPIES

BACKGROUND OF THE INVENTION

The invention relates to a master suitable for the manufacture of electroplated negative copies of metal.

The negative metal copies are hereinafter referred to as father matrices. The father matrices are usually manufactured from nickel or copper and in turn are used for making further copies. For example, the negative father matrices are used to manufacture positive metal copies known as mother matrices. Negative son matrices are manufactured from the positive mother matrices and are used to manufacture copies of the master which are wholly synthetic resin or which have a synthetic resin coating. Such copies are, for example, information carriers such as phonograph records, or in particular optical components such as mirrors, lenses, prisms and the like.

The optical components preferably comprise a supporting member of, for example, glass or quartz. A coating layer of, for example, a light-cured synthetic resin is provided on one side of the supporting member. The surface of the coating layer is the negative of that of the son matrix. The negative father matrix may also be used for making positive copies of a synthetic resin.

According to a current process of manufacturing a master for an optical component, the surface of an aluminum alloy disc is machined to the desired shape, for example an aspherical shape. It is not possible, however, to make the surface of an aluminum alloy super smooth by precision machining. The surface has irregularities in the form of micropits. The surface is not of optical quality.

Another serious disadvantage is that only one father matrix can be manufactured from the master. For this purpose a metal peel, for example a Ni peel or a Cu-peel, is grown on the treated surface of the master by electroplating. The aluminum alloy is then dissolved, and hence the master is lost.

A master for phonograph records is manufactured according to a known method by providing a lacquer layer on one side of a supporting plate, for example a metal or glass plate. An information track is cut in the lacquer layer with a chisel.

The master is provided, on the side of the lacquer layer, with an electrolessly deposited metal layer, for example a Ag layer. A Ag layer can be provided by a chemical metallization process (plating process) by treating the surface, simultaneously or successively, with an aqueous silver salt solution and an aqueous solution of a reducing agent.

A thicker metal layer, for example a Ni layer or a Cu layer, is provided by electroplating on the electrolessly deposited metal layer. With the master plate is finally removed, the lacquer layer is destroyed. Therefore, in this method the master can be used only once.

SUMMARY OF THE INVENTION

It is an object of the invention to provide a reusable master having an optical quality surface having a surface roughness $R_T$ of at most 0.02 $\mu$m.

It is another object of the invention that the copies derived from the master, for example the father matrix, the mother matrix, the son matrix, and the synthetic resin copies, have the same or substantially the same surface quality as the master.

These objects are achieved by a master comprising a preform which on at least one side has a layer of electroplated aluminum. The aluminum surface is precisely machined to a desired profile and is then coated with a layer of titanium nitride.

The preform is preferably metal. Examples of suitable metals are copper or an aluminum alloy. The preform may alternatively be made from a different material, for example glass, quartz or a synthetic resin. These latter materials do not conduct electricity. When nonconductive materials are used, the surface of the preform on which the layer of electroplated aluminum is deposited must first be made electrically conductive by providing thereon an intermediate metal layer by electroless deposition. A suitable intermediate metal layer is a silver layer provided by an electroless chemical metallization process or a vapor-deposited or sputtered layer of, for example, aluminum, copper, silver, gold or alloys thereof.

The layer of electroplated aluminum is provided according to known methods. Such methods are described in, for example, Netherlands Patent Application No. 7812062 (corresponding to U.S. Pat. No. 4,257,854), and the article by van de Berg et al entitled "The electrodeposition of aluminium" (*Philips Technical Review*, Vol. 39, No. ⅔, pages 87–91, 1980). The thickness of the electroplated aluminum layer is not restricted to narrow limits. It may be for example, between 10 and 300 $\mu$m, in particular between 20 and 100 $\mu$m.

The surface of the electroplated aluminum layer has a profile which is identical to the desired profile of the synthetic resin products which are manufactured by the father matrix derived from the master. For example, the surface of a master for photograph records comprises a spiral-like information track provided by a cutting tool, for example a diamond chisel.

The surface of a master for optical components may have a variety of profiles according to the shape of the surface of the products (for example lenses, mirrors, or prisms) which are manufactured by the father matrix or son matrix derived from the master. The master may have, for example, a spherical surface. Alternatively, the master surface may be aspherical.

The desired profile is provided by precision machining, for example superfine milling or turning by a diamond-edged tool. As a result of this treatment, the surface of the electroplated aluminum obtains a perfect optical quality in contrast with aluminum obtained differently. The surface has a supersmooth texture having a surface roughness ($R_T$) of at most 0.02 $\mu$m. The surface does not show any micropits. The surface roughness, $R_T$, denotes the maximum peak-to-valley height.

It is known per se from Netherlands Patent Application No. 7812062 to manufacture a supersmooth surface by a metal-removing treatment of electroplated aluminum. As a result, high grade mirrors, in particular infrared mirrors, can be made. In contrast with the present invention, the Netherlands Patent Application does not relate to the manufacture of a master and the associated problems of the manufacture of electroplated metal copies and the detaching of the copies from the mold while maintaining the optical surface quality of both the master and of the metal copy.

According to the invention, the profiled surface of the master comprises a layer of titanium nitride. Due to the thickness of the titanium nitride layer, the profile of the surface of the layer of electroplated aluminum will change to a small extent. When making masters used in the manufacture of optical components, a suitable correction should be made in the precision treatment of the electroplated aluminium. The thickness of the titanium nitride layer is preferably 10–300 nm.

The titanium nitride is preferably provided by means of a reactive magnetron sputtering process as is described in the article by Aronson et al entitled "Preparation of Titanium NItride by a Pulsed D.C. Magnetron Reactive Deposition Technique Using the Moving Mode of Deposition" (*Thin Solid Films*, Vol. 72, pp. 535–540, (1980). The reactive gas is nitrogen, the plasma is argon and the target is titanium.

The titanium nitride layer adheres excellently to the electroplated aluminum layer and readily follows the profile. The quality of the adhesion and the build up of the titanium nitride layer is so good that the exposed surface of the titanium nitride layer has the same optical properties as the electroplated aluminum layer.

Titanium nitride is an extremely hard and wear-resistant material having excellent scratch resistance. At normal temperature the material is not sensitive to oxidation in air and is chemically stable. For example, the material is not attacked by water or by aqueous solutions of weak acids and bases.

The titanium nitride is an electric conductor so that a metal, for example Ni or Cu, can be deposited thereon directly by electroplating. For manufacturing a negative metal copy, for example a Ni copy, the master is placed in an electroplating bath. The bath comprises, for example, an aqueous solution of nickel sulphamate.

The cathode of the bath is connected to the layer of titanium nitride. When current passes through the baths a Ni peel is deposited on the titanium nitride.

The Ni-peel can easily be detached from the layer of titanium nitride without damaging the titanium nitrode layer. The quality of the master is therefore maintained so that it can be used again for the manufacture of other metal copies.

The deposition of metal on the surface of the titanium nitride and the subsequent detaching of the resulting metal peel are so good that the surface of the metal peel (the father matrix) has the same or substantially the same optical quality as the surface of the titanium nitride layer.

Further copies of the resulting father matrices can be made, for example, into mother matrices and son matrices. Synthetic resin copies are made from the son matrices, for example, by using a compression process or a molding process. The father matrix may also be used for making synthetic resin copies. All of these copies have excellent surface quality which corresponds to that of the master.

It has surprisingly been found that when a layer of titanium nitride is used having a thickness less than or equal to 300 nm, the layer of metal, for example Ni, deposited on the layer of titanium nitride by electroplating has the same properties (such as structure and grain size) as a layer of Ni which has been provided directly on a surface of electroplated aluminum.

The excess voltage required to deposit Ni by electroplating is also the same for titanium nitride as for aluminum. The excess voltage is defined by the current strength equation $i = i_0 e^{-kn}$ where i = required current density,
$i_0$ = exchange current density,
k = constant, dependent on the metal which is deposited by electroplating, and
n = excess voltage.

The excess voltage is determined by various factors, such as diffusion of metal ions in the metal plating bath, the dehydration of the hydrated metal ions, charge transfer, nucleation, and so on.

The titanium nitride layer, in a thickness $\leq 300$ nm, provided on electroplated aluminum does not influence the electroplating of metal, in particular Ni. The characteristics of the deposited metal layer are not influenced by the titanium nitride layer, either. The electroplated metal layer can be detached from the surface of the titanium nitride without any problems.

In a further preferred embodiment of the master according to the invention, a layer of titanium is present between the layer of electroplated aluminum and the layer of titanium nitride. The thickness of the titanium layer is, for example, 2–8 nm. The layer can be provided in a simple manner by a small adaptation of the reactive sputtering process used to provide the titanium nitride. By withholding nitrogen in the first phase of the sputtering process, titanium will be deposited. The plasma is argon and the target is titanium.

The layer of titanium improves the bonding of the titanium nitride layer to the layer of electroplated aluminum if the aluminum has an oxide skin. During the mechanical treatment of the electroplated aluminum which usually takes place in ambient air, an oxide skin will be formed. If the oxide skin is removed, no intermediate layer of titanium is necessary. However, since the removal of the oxide skin requires an extra process step, it is preferred to leave the oxide skin and to provide an intermediate layer of titanium in order to obtain a good bond between the titanium nitride and the aluminum.

If no intermediate layer of Ti is provided, a titanium nitride-oxide layer will be formed upon providing titanium nitride. If a metal, for example Ni, is grown on this layer by electroplating, reduction to titanium will take place. The grown metal peel will not work loose from the titanium surface.

DESCRIPTION OF THE PREFERRED EMBODIMENTS

Figure 1:
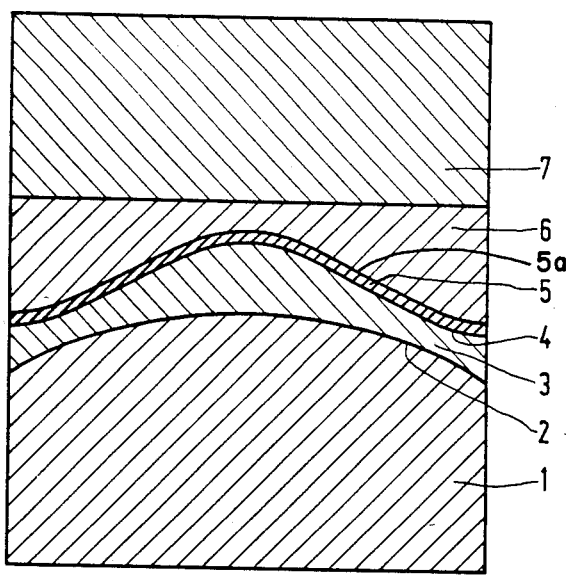
FIG. 1 is a cross-sectional view of a master according to the invention used in the manufacture of a negative metal copy (father matrix).

Referring to FIG. 1, denotes a preform 1 is manufactured from an aluminum alloy of the following composition in % by weight.
Mg 0.5–2.0,
Si 0.5–1.5,
Mn 0.2–1.5,
Fe $\leq 0.4$,
Cu $\leq 0.5$,
other impurities $\leq 0.1$,
Al for the remainder.

Preform 1 has a spherical surface 2 on which an aluminum layer 3 having a thickness of 50 $\mu$m is deposited electrolytically (by electroplating). The electrolysis bath used for this purpose comprises a solution of 1.2 molar AlCl$_3$ and 0.2 molar LiAlH$_4$ in tetrahydrofuran. The electrolysis is carried out with a current density of 1A per dm$^2$. The hardness of the layer of electroplated aluminum is 70 Vickers.

The electroplated aluminum layer 3 is turned on a precision lathe having a diamond chisel. An aspherical mirror surface 4 is obtained having a surface roughness, R$_T$, of approximately 0.01 μm.

The surface 4 is degreased ultrasonically. The preform is then provided in a sputtering device and is subjected to a reactive triode sputtering process carried out at a voltage of 1.6 kV required to make a plasma. A Ti target and an argon plasma at a pressure of $22.6 \times 10^{-2}$ Pa are present in the device. After a short period of time, N$_2$ gas is admitted to the device until a partial pressure of $4 \times 10^{-2}$ Pa of nitrogen is present. As a result of the sputtering process, a thin 5 nm layer of Ti, not shown, is deposited on the electroplated aluinum layer 3, and a titanium nitride layer 5 having a thickness of 90 nm is provided on the Ti layer.

The exposed surface 5a of the titanium nitride layer forms the duplication surface of the master. This surface is supersmooth and has a surface roughness, R$_T$, of 0.01 μm.

A Ni copy (father matrix) is manufactured from the master thus obtained by electroplating. For this purpose, the master is placed in a nickel sulphamate bath and is connected to the cathode. Upon current passage, Ni is deposited on the titanium nitride layer 5. The resulting nickel layer 6 has a thickness of 5 mm. The layer 6 is ground and is provided with a supporting plate 7 of stainless steel which is adhered to the ground surface of layer 6.

The resulting father matrix 6 and 7 is detached from the master without any problems. The titanium nitride layer 5 remains entirely intact so that the master can be used again for manufacturing metal copies.

Figure 2:
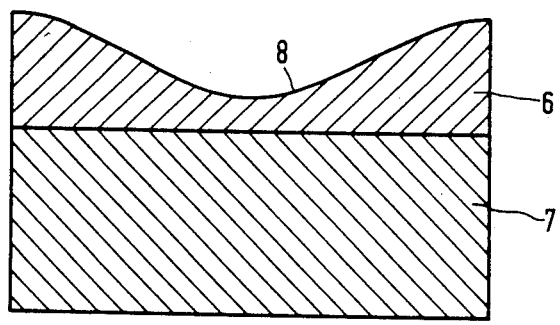
FIG. 2 is a cross-sectional view of the father matrix obtained by using the master of FIG. 1.

The father matrix 6,7 shown in FIG. 2 has an aspherical surface 8 which is the negative of the surface of the master. The surface 8 has a perfect optical quality with a surface roughness, R$_T$, of approximately 0.01 μm.

What is claimed is:

1. A duplication master for manufacturing negative copies by electroplating a metal onto a duplication surface of the master, said master consisting essentially of:
    a preform having a surface;
    a layer of electroplated aluminum on the preform surface, said aluminum layer having a shaped surface opposite the preform surface, said shaped surface having a desired profile; and
    an outer coating layer on the aluminum layer, said outer coating layer having an exposed surface which is the duplication surface of the master, said outer coating layer consisting essentially of titanium nitride.

2. A duplication master as claimed in claim 1, wherein the shaped surface of the aluminum layer is given its desired profile by precision machining.

3. A duplication master as claimed in claim 2, wherein the thickness of the titanium nitride layer is between 10 and 300 nanometers.

4. A duplication master as claimed in claim 3, wherein an intermediate layer of titanium is provided between the electroplated aluminum layer and the titanium nitride layer.

* * * * *